US000001268H

United States Statutory Invention Registration [19]

[11] Reg. Number: H1268

[43] Published: Dec. 7, 1993

Askins et al.

[54] METHOD AND APPARATUS FOR CONTROLLING INTERNAL ROTATION OF PRINCIPAL AXES IN FABRICATION OF BIREFRINGEMENT FIBERS

[76] Inventors: Charles G. Askins, 10103 Marlboro Pike, Marlboro, Md. 20772; Michael J. Marrone, 517 Old Pasture La., Severna Park, Md. 21146

[21] Appl. No.: 906,093

[22] Filed: Jun. 29, 1992

[51] Int. Cl.[5] ..... G01N 21/00; C03B 37/075

[52] U.S. Cl. ..... 356/73.1; 65/2; 65/3.11; 65/29

*Primary Examiner*—Bernarr E. Gregory

[57] ABSTRACT

A technique and apparatus for detecting the internal rotation of the principal axes in the fabrication of birefringent fibers is based upon a new method for producing and interpreting the interference fringe pattern backscattered power from a birefringent fiber side-illuminated with a laser light source to determine the internal orientation of the strain-inducing axes. An apparatus employing this technique for controlling internal rotation of the principal axes provides for adjustment of the orientation of at least one of the traction surfaces pulling the fiber during drawing fabrication to maintain parallel alignment of the planes of rotation of the surfaces to reduce the fiber rotation-inducing motion which leads to internal rotation of the fiber's principal axes.

26 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

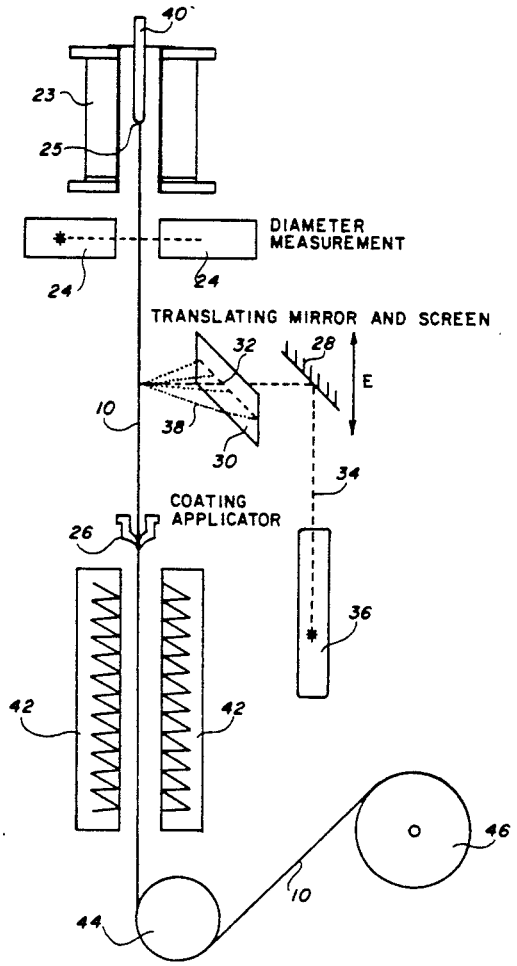

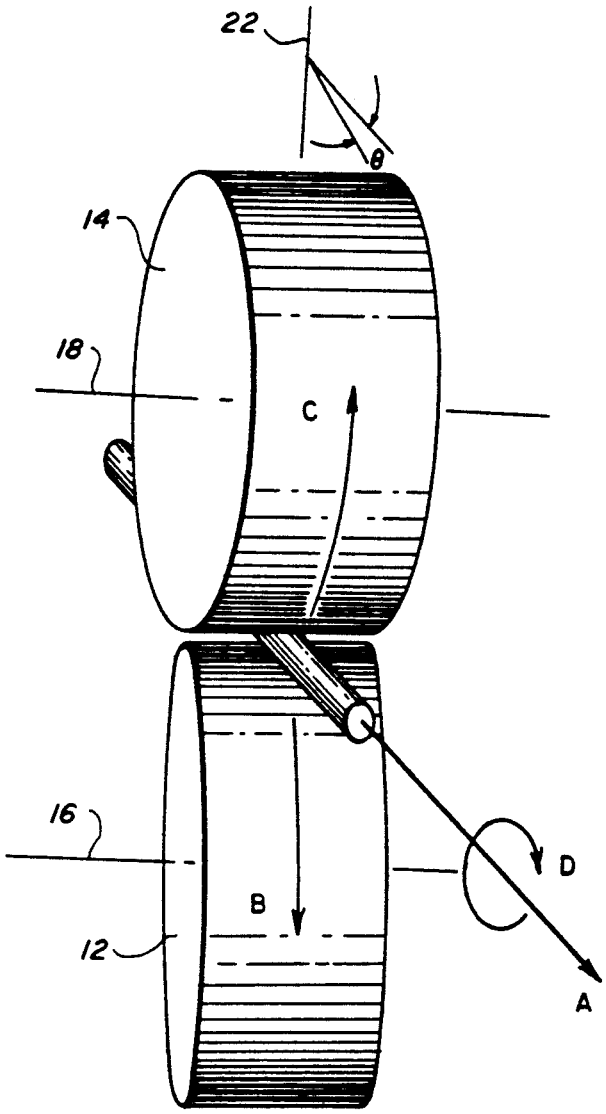
FIG. 1
FIG. 3
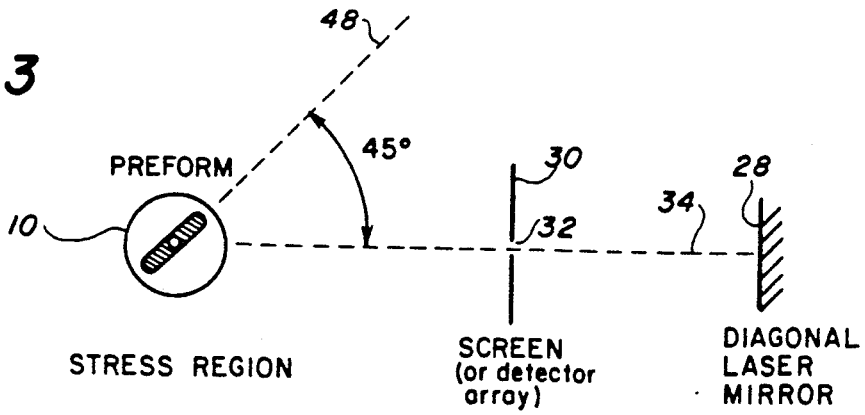

METHOD AND APPARATUS FOR CONTROLLING INTERNAL ROTATION OF PRINCIPAL AXES IN FABRICATION OF BIREFRINGEMENT FIBERS

BACKGROUND OF THE INVENTION

1. Field of the Invention

The invention relates generally to optical fibers and in particular to the drawing fabrication of birefringent fibers. More specifically, the invention relates to an optical technique for determination of the rotation of the principal axes during fabrication of the fiber, and the control of the fabrication apparatus to remove the cause of fiber rotation and thus reduce axes rotation.

2. Background Art

The performance of polarization maintaining couplers and devices in preserving high polarization-extinction ratios strongly depends upon the alignment of the principal birefringent axes ("PBA") of the polarization maintaining fiber ("PMF") with those of the device or a second PMF. Typical commercially-available PMF's have rates of internal rotation of the birefringent axes ranging from 0.44 to 11°/cm. The misalignment due to this internal rotation has been cited as limiting the polarization separation in tapered couplers to slightly better than −23 dB, while PMF's may support −45 dB separation.

The presence of undesirable rotation of the PBA in commercial specialty fibers was first recognized only as recently as 1985. Fabrication of fiber optic polarization-maintaining couplers and connectors depend on the alignment of the PBA, and polarized signal separation is degraded by a rapid rotation of the axes. Typical rotation rates range from 3 to 15 degrees per centimeter, and were first publicly recognized by the present inventors as being due to small misalignments in the mechanism used to draw the fiber. The performance of low birefringence fibers drawn with the same misalignments was not impaired.

Due to the recent recognition of the problem of PBA rotation, a technique has not yet appeared for its correction. The method by which the internal rotation of fiber axes was first established could be used to tune a draw tower (part of the drawing mechanism to draw the glass fiber preform) to address the defect, but it involves a time consuming technique which destroys the fiber sample being investigated. Such an approach would require a trial-and-error routine of drawing a length of fiber, destructively measuring the rotation rate and direction, and then adjusting the draw mechanism. The minute misalignment required to produce a significant rotation rate suggests that each new correction would only be stable and accurate for a short time before another test and adjustment would be necessary. It is therefore believed that no direct precedent for this invention exists.

SUMMARY OF THE INVENTION

Accordingly, the objects of the present invention include: to provide a novel method and an apparatus for determining the orientation of the principal. axes at a point in a birefringent fiber and detecting the rotation of the principle axes along the length of the fiber during fabrication thereof; to provide such method and apparatus which is simple to implement; to provide such method and apparatus based upon an optical technique using laser light to illuminate the fiber; to provide such method and apparatus using the interference fringe pattern created by the light backscattered from the fiber; to provide a method and apparatus for removing the cause of principal axes rotation during fabrication of a birefringent fiber; and to provide such method and apparatus which can be readily incorporated into conventional mechanisms for drawing fabrication of such fibers.

To attain these and other objects, the invention involves two distinct elements: a technique and an apparatus for detecting the rotation of the PBA during draw; and the means for altering the alignment of the tractor assembly which actually determines the rate of rotation of the fiber axes.

The first element employs a new method of determining the orientation of the major birefringent axes in a polarization maintaining fiber through the observation of a backscattered interference fringe pattern. The pattern is created by light backscattered from the fiber when it is illuminated in a direction normal to its length by a low-power laser. As the fiber is rotated about its long axis during the drawing fabrication, the fringe pattern exhibits motion related to changes in the angle between the incident laser and either of the PBA. Motion of the fringes indicates rotation of the PBA of the fiber. An absence of fringe motion in such an arrangement indicates the lack of internal rotation which is desirable. The second element provides means for adjusting the position of at least one traction surface of the traction assembly to maintain alignment therebetween to reduce rotation of the drawn fiber, and hence the internal rotation of the PBA.

The present invention addresses a newly-recognized problem in polarization maintaining fiber fabrication. No method for correcting this problem existed previously. Both aspects of the invention are new features, particularly the backscatter technique of determining the orientation and detecting the rotation of internal fiber structures. The observation of backscatter has been used to determine the index of refraction profile in cross section of nominally low-birefringence cylindrically symmetric fibers, but not for determining the orientation of PBA in high-birefringence fibers.

The present invention provides a significant improvement in the production of polarization maintaining fibers whereby the rate of internal rotation of the PBA along the length of the fiber may be controlled or held to below 5 degrees per meter of fiber. This represents an order of magnitude improvement over the lowest rotation rate observed in fibers presently available commercially. It may now be possible to design PMF devices where orientation of the birefringent axes must remain constant over lengths of several meters.

BRIEF DESCRIPTION OF THE DRAWINGS

FIG. 1 schematically illustrates the misalignment of the traction surfaces which cause rotation of the fiber.

FIG. 3 shows, to an enlarged scale, the radial angular position of the incident laser beam relative to the stress-inducing structures in the fiber.

DESCRIPTION OF THE PREFERRED EMBODIMENT

Figure 2:
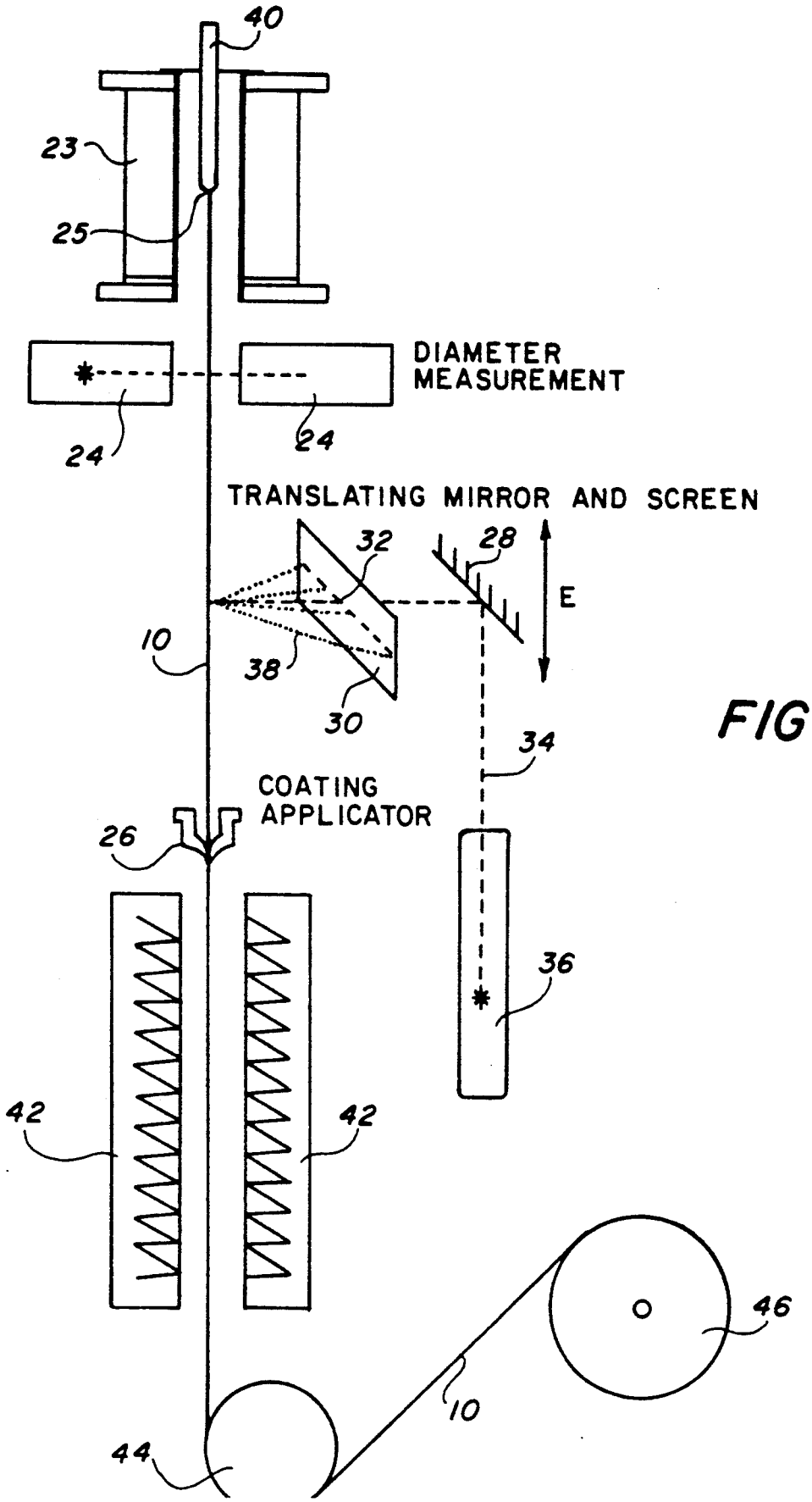
FIG. 2 schematically illustrates the technique for detecting the rotation of the principal birefringent axes during fiber fabrication.

The method for monitoring the orientation of the principal birefringent axes ("PBA") involves side illumination with a low power laser source to generate a backscattered interference pattern determined by the fiber cross section. The inventors have observed the backscattered light from several polarization maintaining fibers ("PMF's") and have developed a technique for identifying the orientation of the PBA from a characteristic fringe motion as either of these axes is rotated through an orientation normal to the incident laser beam.

Consider a fiber which has a characteristic internal rotation of its PBA along the fiber's length, as is the case for a PMF being drawn with a constant twist due to some misalignment in the drawing mechanism. Translation of a laser along the length of the fiber while maintaining normal incidence thereto results in an effective rotation of the PBA relative to the incident laser beam. Motion in the fringe pattern while translating the laser along the fiber length therefore indicates the presence and rate of the internal rotation per length of fiber.

The variation in the fringe pattern with fiber rotation is predominantly attributable to ellipticity in the fiber's outer diameter. A second contributing effect, first noted by the present inventors, is due to the different refractive index of the non-circular stress-inducing structures included in the fiber to effect large birefringence.

Axis determination through observation of the backscattered fringe pattern can be achieved by using a low power HeNe or like laser, a rotational fiber mounting and an interposed screen for intercepting the backscattered light from the fiber. As a PMF is rotated about its long axis while illuminated by a beam incident normal to this axis, fringes either evolve and recede from the center of the pattern, or converge and disappear into the center. At the angle when the fringe motion changes from receding to converging, one of the PBA is aligned with the axis of the laser beam. One can determine which axis is aligned with the laser by conventional techniques, such as microscopy of the fiber endface. This is especially important for aligning like optical axes of PMF's for splicing, and for joining PMF's to polarization aligned devices, i.e. to ensure that the respective fast and slow axes of the devices are aligned at the splice. Fringe motion will therefore reverse motion every 90° of fiber rotation. The most rapid fringe motion is observed at 45° to either major axis, an effect which is employed in the method of the present invention when monitoring axial rotation during fiber draw.

When compared to previous methods of finding the orientation of the PBA, the backscatter method demonstrates improved accuracy and ease of implementation. Both forward and backscatter methods have the advantages of non-contact with and non-destruction of the fiber, while the latter has improved accuracy. The backscatter approach also represents a significant improvement in accuracy and accessibility to the test fiber over the elasto-optic method.

The internal rotation of the PBA observed in conventional PMF is an effect incorporated during the drawing of the fiber preform into its final waveguide dimensions. The processes for fabricating the preform may be considered to yield a glass rod with internal stress structures extending along its length with no significant rotation of geometry. If the preform is not rotated during the drawing process, any incorporated rotation of the PBA must arise from a rotational strain on the fiber which is partially relieved by rotational shear in the low viscosity neckdown region. Fibers of very low birefringence have been produced in part through the rapid rotation of the preform during drawing in order to average out any birefringence-producing structures present in the preform.

The inventors have demonstrated that a small misalignment of the two friction surfaces of the tractor wheel and capstan of the conventional drawing apparatus induces a twisting strain which is translated along the length of the fiber to the point where neckdown occurs. FIG. 1 shows schematically the rotation imparted to the fiber, along with the intended axial velocity when the planes of rotation of the two driving surfaces are not parallel.

A glass fiber or rod 10 is moved in the direction A along its long axis by a traction arrangement represented by two friction surfaces 12 and 14 in rolling contact with each other to grip and move the fiber. Friction surfaces 12 and 14 may be cylindrical members supported for rotation in the directions shown by arrows B and C about respective axis 16 and 18. During the drawing process, the axes 16, 18, may become skewed and misaligned, as shown to an enlarged scale in FIG. 1 by the rotational angle 8 about the vertical line 22. This misalignment causes a rotation of the fiber 10 about its longitudinal axis, indicated by the arrow D, as the fiber is drawn.

A calculation for the rate of rotation per length 1 considers a fiber of diameter d constrained by the motion of the two surfaces in frictional contact moving with a directional difference described by the angle Θ. A complete rotation of the fiber occurs when the component of relative motion of the surfaces perpendicular to the bisector of angle Θ becomes equivalent to the circumference of the fiber:

$$2\,d = 1 \sin(\Theta) \text{ (for small } \Theta)$$

For a 200- μm diameter fiber, an angle Θ of 0.072° will produce a full rotation every meter of length. The resultant strain adds a rotational flow to the dominant longitudinal and radial flows in the neckdown before the fiber is quenched to solidification. The fraction of the twist induced by the tractor which will be incorporated into the fiber's geometry will be proportional to the length of the low-viscosity region in the neckdown, the torsional spring constant of a length of fiber, and draw tension. It will be inversely proportional to the hot zone glass viscosity, the distance from the tractor to the neckdown, and draw speed.

A schematic of an apparatus for implementing the detection of internal rotation of the fiber's PBA is shown in FIG. 2. In a region of the drawing apparatus where an appreciable length (≅0.3 meters) of bare fiber 10 is exposed, such as between the location where the fiber diameter is measured by a measurement device 24 and the location of a primary coating applicator 26, an adjacent track (not shown) is aligned parallel to the fiber for carrying a mirror 28 and a screen 30 having an aperture 32 therein. The mirror 28 is supported diagonally relative to the fiber 10 and the track on which the mirror moves. A laser beam 34 from a source 36 is aimed parallel to the fiber 10 and the track, strikes the diagonal mirror 28 and is reflected to pass through the aperture 32 in the screen 30, intersecting the fiber perpendicular to its length. The generated backscatter pattern 38 is intercepted by the screen 30. The mirror 28 and the screen 30 are then translated vertically along the track, as shown by arrow E, and any fringe motion is observed on the screen.

In the fiber drawing mechanism shown in FIG. 2, a solid preform 40 is softened by a furnace 23 at the neckdown region 25 to form the fiber 10, which is moved past the measurement device 24 to gauge the fiber diameter, and through the coating applicator 26 which applies the primary coating onto the fiber. The coated fiber 10 passes through a coating curing chamber 42, through the draw tractor 44 and onto a storage roll 46. This drawing arrangement is known in the art.

FIG. 3 shows the radial angular position of the incident laser beam 34 with the stress-inducing structures in the fiber or preform 10. Because the most rapid fringe motion occurs at 45° to the PBA, one of which is identified as 48, the beam 34, mirror 28 and screen 30 are centered at 45° to maximize sensitivity to fiber axis rotation. Detection of fringe motion may be either by direct visual observation, or assisted by electronic photodetection, such as mirror scanned detector or linear detector array. With the latter approach electronic motion detection circuitry may be used in an automated feed-back arrangement to adjust alignment of the fiber traction surfaces in response to detection of fringe motion.

After detection of PBA rotation has been established, adjustment of the drawing mechanism may be effected to increase, null, or reverse the indicated internal rotation. It is believed that the rotation is induced by a misalignment of the capstan drive wheel and the driving traction belt conventionally used for gripping the fiber to effect draw. If the planes of rotation of the wheel and belt (or variations on the capstan arrangement) are not parallel, then a component perpendicular to the predominant motion of the fiber causes the fiber to roll between the wheel and belt, and a twist results, as described above. An estimate indicates that a 0.007 degree misalignment causes a 125 micron fiber diameter to rotate 360° per meter of length. Some of this twist becomes permanent in the fiber when the rotational stress becomes sufficient to overcome the viscosity of the fiber in the neckdown region.

Figure 6:
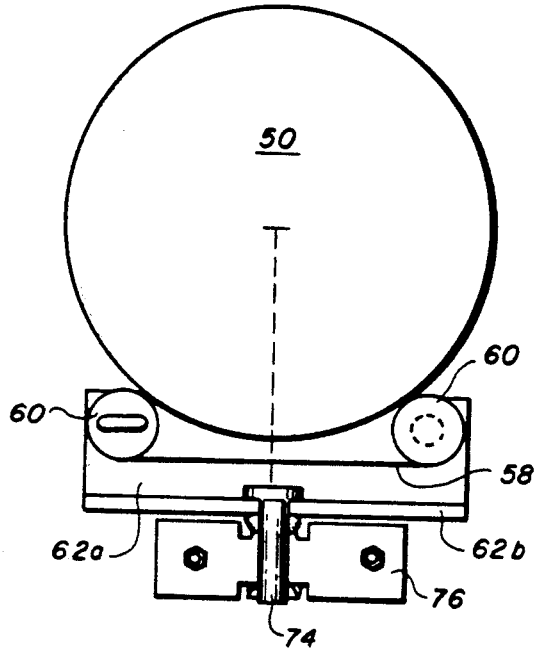
FIG. 6 is a side elevational view of the apparatus as seen along line 6—6 in FIG. 5, with a portion shown in section.
Figure 5:
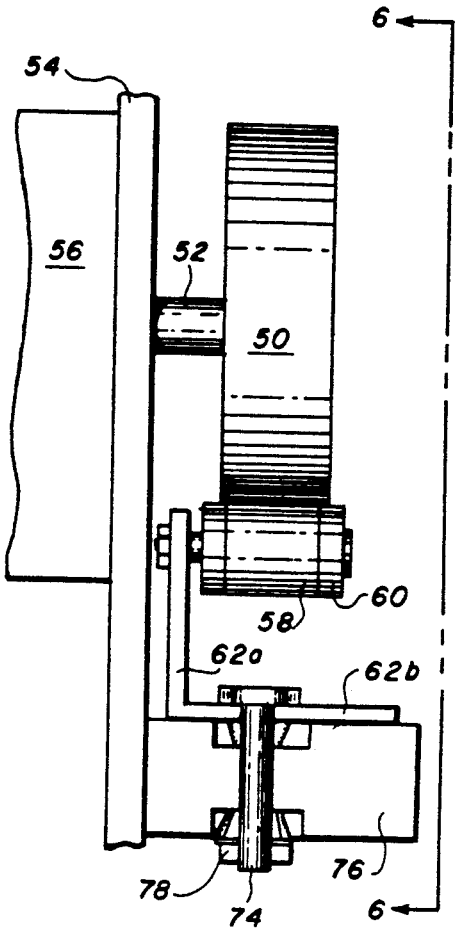
FIG. 5 is a partial elevational view of the apparatus of FIG. 4, with a portion shown in section.
Figure 4:
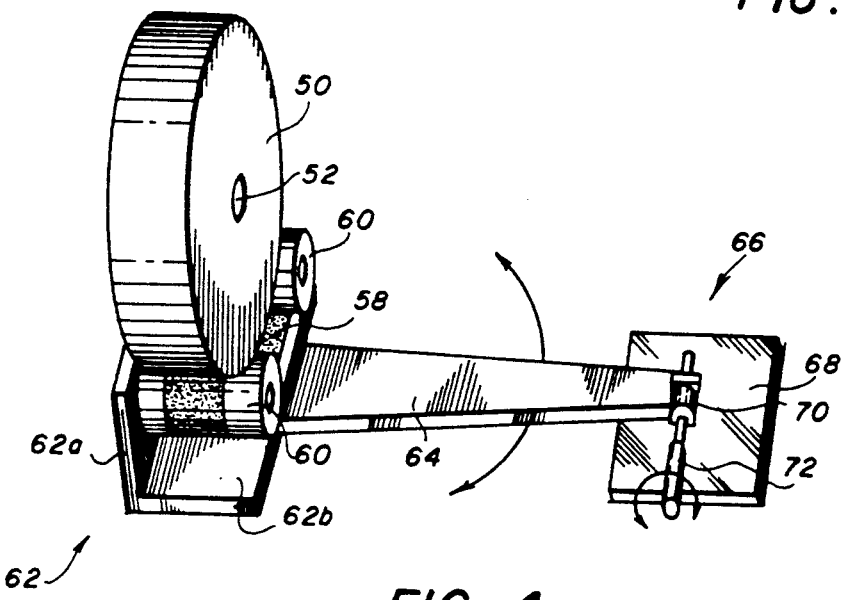
FIG. 4 is a pictorial view showing an apparatus for controlling the alignment of the tractor assembly which determines the rate of rotation of the fiber axes.

The simplest means for reducing the internal rotation of the fiber axes is to minimize the misalignment in the drawing mechanism. A new modification to the conventional drawing mechanism which includes a means of varying the angular relationship of the planes of rotation of the two drive surfaces is shown in FIGS. 4–6. A tractor wheel 50 is mounted on a shaft 52 journaled to a support 54 such that the orientation of the plane of rotation of the wheel is fixed. A power means 56 rotates the shaft 52 and wheel 50. A tractor belt 58 is trained over two idler rollers 60 rotatable supported in spaced-apart relation on a carrier 62 which illustratively can be embodied as a L-shaped bracket having an upstanding portion **62*a* on which the idler rollers are supported and a base portion 62*b***.

A lever arm 64 is rigidly fixed at one end to the base portion **62*b*, with the other end connected to an adjustment means 66 having a stationary base 68 on which a threaded nut 70 is mounted. A micrometer-type adjustment screw 72 is threaded through the nut 70, and the free end of lever arm 64** is fixed to the adjustment screw and may be biased against the nut by a spring (not shown).

As shown in FIGS. 5 and 6, the base portion **62*b* of the carrier 62 is apertured to receive a spindle 74 which is received in a boss 76 rigidly attached to the wheel support 54. The lower end of the spindle 74 is threaded to receive a fastener 78 so that the carrier 62 can be adjustably secured against the boss 76. As seen in FIG. 5, the base of carrier 62 is apertured to receive the spindle 74 at a location in line with the vertical diameter extending through the rotational axis of the tractor wheel 50. With this arrangement, the belt carrier 62 can pivot about an axis which intersects that of the tractor wheel 50 at 90°. The angular position of the belt carrier 62 can be suitably determined and adjusted by turning the adjustment screw 72 to align the plane of rotation of the tractor belt 58 with the plane of rotation of the tractor wheel 50. If an automated control scheme is employed, the adjustment screw 72** can be motorized and controlled by signals from an electronic photodetector arrangement noted above.

In the foregoing arrangement, the idler rollers 60 are mounted so that their separation distance can be varied to permit easy installation and removal of the tractor belt 58, and to permit adjustment of the contact tension with the surface of the tractor wheel 50. While the tractor wheel 50 is driven by the power means 56, it is possible to provide power means to drive the tractor belt 58 instead. This latter arrangement is not as desirable since more weight then has to be supported by the roller carrier 62 which, since it is pivotally mounted, may make more difficult fine adjustments of the orientation of the tractor belt 58 relative to the tractor wheel 50.

In fiber samples produced with the mechanism shown in FIGS. 4–6, the inventors have demonstrated a fiber whose maximum rate of rotation is smaller by a factor of 10 over a length of 50 cm, and smaller by a factor of 60 over 10 cm lengths. The inventors were able to selectively induce a misalignment in the draw mechanism which resulted in fibers with rotation rates comparable to those observed in commercial fibers.

The minimum internal rotation achievable with the above-described method will be limited by factors in three categories. The first is the limit of detectable twist by which corrections to the draw mechanism may be guided. Application of the backscatter method to stationary fibers for determining the orientation of major axes indicates an angular sensitivity under one degree. Illumination of the fiber at 45° to the major axes is seen to improve this sensitivity appreciably. If a long region of the fiber (0.5 m) is accessible to laser illumination before being coated, a twist rate of 1°/m should be detectable. Possible complications would include fiber diameter fluctuations which contribute noise to the backscatter measurement technique. Since only some fraction of the generated twist is actually incorporated into the fiber, a permanent rotation of under 1°/m seems possible. The second determining category involves the variables which determine the effect and magnitude of rotational strain, such as draw temperature and rate, fiber diameter, and draw mechanism dimensions. It may be desirable to vary these parameters specifically to favor the problem of fiber twist. The final group of factors have been considered above, and include stability of the adjustable drawing traction surfaces, fiber preform uniformity, and the ability to rapidly scan a long length of fiber while obtaining a stable image of the backscatter pattern. Innovation in this area could lead to automated feedback for control.

Other methods which should be considered as included variations on the method disclosed herein include (1) schemes for launching and detecting the light beam used to generate the backscatter fringe pattern and (2) adjustments to the draw process in response to an observed internal rotation. Other schemes for launching and detecting the light beam include:

1. The above-described mirror and screen combination may be oscillated mechanically along the fiber's length.

2. The fringe pattern may be imaged onto a detector which is viewed remotely as the detector and beam are swept along the fiber's length.

3. The laser may be scanned along the length of the fiber by a deflecting mirror and lens combination, and the fringe pattern may be collected by an appropriately formed mirror which would direct the fringe image onto a detector array.

Adjustments to the draw process include:

1. The details of the fiber tractor mechanism may vary from the conventional capstan design. Any method for actively correcting the alignment plane of motion of the two gripping surfaces is included herein.

2. An alternate method of adjustment would be to compensate for any twist induced by the tractor mechanism by rotating the preform about its long axis.

It is understood that many other changes and additional modifications of the invention are possible in view of the teachings herein without departing from the scope of the invention as defined in the appended claims.

What is claimed is:

1. A method for detecting the internal rotation of the principal axes of a birefringent fiber comprising:

directing a beam of laser light toward said fiber in a direction normal to the longitudinal axis of said fiber to generate a backscattered interference fringe pattern determined by the fiber cross section;

visually displaying said interference fringe pattern; and providing relative parallel movement between said fiber and the point of incidence of said beam of collimated light on said fiber;

wherein said visual displaying of said interference fringe pattern is done effective to exhibit motion related to the angle between the incident beam of light and either of the principal axes, the fringes of said pattern evolving effective to cause, at the angle where the front motion changes from receding to covering, an indication that one of the principal axis is aligned with the axis of said beam of light.

2. A method as set forth in claim 1, wherein said beam of collimated light is provided by a low power laser source.

3. A method as set forth in claim 1, wherein the relative parallel movement is provided by moving the beam of collimated light with respect to said fiber.

4. A method as set forth in claim 1, wherein the relative parallel movement is provided by moving said fiber relative to a stationary beam of collimated light.

5. A method as set forth in claim 4, wherein movement of said fiber is provided by movement of said fiber in a drawing fabrication technique for said fiber.

6. A method as set forth in claim 1, wherein said interference fringe pattern is visually displayed on a screen positioned to intercept said pattern backscattered from said fiber.

7. A method as set forth in claim 1, wherein said interference fringe pattern is visually displayed by a photodetection device.

8. An apparatus for detecting the internal rotation of the principal axes of a birefringent fiber comprising:

a source of a beam of collimated light;

means to direct said beam of light toward said fiber in a direction normal to the longitudinal axis of said fiber to generate a backscattered interference fringe pattern determined by the fiber cross section;

means to provide a visual display of said interference fringe pattern; and means to provide relative parallel movement between said fiber and the point of incidence of said beam of collimated light on said fiber, said visual display of said interference fringe pattern exhibiting motion related to the angle between the incident beam of light and either of the principal axes, the fringes of said pattern evolving effective to cause, at the angle where the fringe motion changes from receding to converging, an indication that one of the principal axes is aligned with the axis of said beam of light.

9. An apparatus as set forth in claim 8, wherein said source of the beam of light is a low power laser.

10. An apparatus as set forth in claim 9, wherein said laser is positioned to direct said beam of light in a direction parallel to the length of said fiber, and further comprising a reflector located to intercept said beam of light and direct said beam normal to said fiber.

11. An apparatus as set forth in claim 10, wherein the means to provide relative parallel movement comprises means to move said laser light and said reflector with respect to said fiber.

12. An apparatus as set forth in claim 11, wherein said means to provide a visual display comprises a screen positioned to intercept said fringe pattern backscattered from said fiber, and said means to provide relative movement comprises a member of the group consisting of: (a) means to move said laser and (b) reflector and said screen in unison parallel to the length of said fiber.

13. An apparatus as set forth in claim 11, wherein said means to provide a visual display comprises a photodetection device positioned to intercept said fringe pattern backscattered from said fiber, and said means provide relative movement comprises means to move said laser, said reflector and said photodetection device in unison parallel to the length of said fiber.

14. An apparatus as set forth in claim 10, wherein the means to provide relative parallel movement comprises means to move said fiber with respect to a stationary light source.

15. An apparatus as set forth in claim 14, wherein said means to move said fiber comprises traction means for pulling said fiber in a drawing fabrication of said fiber.

16. An apparatus as set forth in claim 8, wherein the means to provide relative parallel movement comprises means to move said light source with respect to said fiber.

17. In a mechanism for drawing fabrication of a birefringent fiber including coacting means for pulling a length of said fiber, an apparatus for detecting the internal rotation of the principal axes of said fiber induced by said drawing mechanism, comprising:

a low power laser source for directing a beam of collimated light parallel to the length of said fiber;

a reflector positioned to direct said beam of light toward said fiber normal to the length of said fiber so as to generate a backscattered interference fringe pattern determined by the fiber cross section; and display means positioned to intercept and provide a visual display of said interference fringe pattern;

said visual display of said interference fringe pattern exhibiting motion relative to the angle between the beam of light incident on said fiber and either of the principal axes, the fringes of said pattern evolving effective to cause, at the angle where the fringe motion changes from receding to converging, an indication that one of the principal axis is aligned with the axis of said beam of light.

18. The mechanism of claim 17, wherein said coacting pulling means comprises contacting rotating surface which apply a traction force to pull said fiber, said mechanism further comprises:

control means for said rotating surfaces includes means for adjusting the orientation of at least one of said rotating surface effective to cause the planes of rotation of said surfaces to be adjusted parallel with respect to each other to reduce induced rotation of said fiber due to misalignment of said rotating surfaces.

19. The mechanism of claim 18, wherein said control means comprises means supporting said at least one rotating surface for pivotal movement relative to the other rotating surface to permit said parallel alignment of the planes of rotation.

20. The mechanism of claim 19, wherein said display means comprises a screen positioned substantially normal to said light beam and having an apertures to pass said light beam to said fiber.

21. The mechanism of claim 19, wherein said display means comprises a photodetection device positioned to intercept said backscattered interference fringe pattern.

22. In combination with a mechanism for drawing fabrication of a birefringent fiber having coating rotary surfaces for pulling a length of said fiber through the mechanism, an apparatus for detecting and controlling the internal rotation of the principal axes of said fiber induced by misalignment of said rotary surfaces, comprising:

a low power laser source for directing a beam of collimated light parallel to the length of said fiber;

a reflector positioned to direct said beam of light toward said fiber in a direction normal to the length of said fiber so as to generate an interference fringe pattern determined by the fiber cross section and backscattered by said fiber;

display means positioned to intercept and provide a visual display of said interference fringe pattern, said visual display of said interference fringe pattern exhibiting motion related to the angle between the beam of light incident on said fiber and either of the principal axes, the fringes of said pattern effective to cause, at the angle where the fringe motion changes from receding to converging, an indication that one of the principal axis is aligned with the axis of said beam of light; and control means for said coacting rotary surface including means for adjusting the orientation of at least one of said rotary surface effective of cause the planes of rotation of said surfaces to be adjusted parallel with respect to each other to reduce induced rotation of said fiber due to misalignment of said rotary surfaces.

23. The combination of claim 22, wherein said control means comprises means supporting said at least one rotary surface for pivotal movement relative to the other rotary surface to permit said parallel alignment of the planes of rotation.

24. The combination of claim 23, wherein said display means comprises a screen positioned substantially normal to said light beam and having an aperture to pass said light beam to said fiber.

25. The combination of claim 23, wherein said display means comprises a photodetection device positioned to intercept said backscattered interference fringe pattern.

26. A method for determining the orientation of the principal birefringent axes at a point in a birefringent fiber, comprising steps for:

directing a beam of laser light toward said fiber in a direction normal to the longitudinal axis of said fiber to generate a backscattered interference fringe pattern determined by the fiber cross section;

visually displaying said interference fringe pattern;

causing rotation of said axes with respect to said light effective to observe convergent or divergent motion of said fringe pattern;

determining the point of said rotation where there is a reversal of said motion, so as to identify that one of said birefringent axes is aligned with said light;

determining which of said axes is aligned with the laser light.

* * * * *